US007624348B2

(12) United States Patent
Shuping et al.

(10) Patent No.: US 7,624,348 B2
(45) Date of Patent: *Nov. 24, 2009

(54) SYSTEM AND METHOD FOR WEB BROWSING

(75) Inventors: David T. Shuping, Chantilly, VA (US); William R. Johnson, Leesburg, VA (US)

(73) Assignee: Browse3D, Inc., Chantilly, VA (US)

( * ) Notice: Subject to any disclaimer, the term of this patent is extended or adjusted under 35 U.S.C. 154(b) by 1411 days.

This patent is subject to a terminal disclaimer.

(21) Appl. No.: 09/985,415

(22) Filed: Nov. 2, 2001

(65) Prior Publication Data

US 2002/0054114 A1     May 9, 2002

Related U.S. Application Data

(63) Continuation of application No. 09/498,079, filed on Feb. 4, 2000, now Pat. No. 6,313,855.

(51) Int. Cl.
*G06F 3/00* (2006.01)
(52) U.S. Cl. ...................... 715/760; 715/792
(58) Field of Classification Search .......... 345/854, 345/853, 850, 848, 851, 855, 804, 805, 783, 345/782, 738, 739, 760, 419; 715/501.1, 715/792, 748, 749, 760, 968, 854; 709/201, 709/203, 217, 219
See application file for complete search history.

(56) References Cited

U.S. PATENT DOCUMENTS 5,796,393 A    8/1998  MacNaughton et al.
5,838,326 A   11/1998  Card et al.
5,978,817 A   11/1999  Giannandrea et al.
6,016,494 A    1/2000  Isensee et al. ............... 707/102
6,037,935 A    3/2000  Bates et al.

(Continued)

FOREIGN PATENT DOCUMENTS

CA         2279145       2/2000
WO     WO 97/29414 A2    8/1997

OTHER PUBLICATIONS

George Robertson et al.: "Data Mountain: Using Spatial Memory for Document Management," Proceeding of the 11th Annual Symposium on User Interface Software and Technology, Nov. 1-4, 1998, San Francisco, CA, pp. 153-162.

(Continued)

*Primary Examiner*—Steven P Sax
(74) *Attorney, Agent, or Firm*—Womble Carlyle Sandridge & Rice, PLLC (57) ABSTRACT

A system and method for web browsing contemporaneously displays multiple web pages, preferably within a single window, for a user to view. In a preferred embodiment, a current web page, a past web page, and a future web page are contemporaneously displayed in a single window. In this embodiment, the present invention tracks a past web page and renders it in a first panel, renders the current web page in a second panel, and identifies a hyperlink in the current web page to retrieve and render the future web page in a third panel. Preferably, all of these panels are embedded within a single window. In this manner, the user contemporaneously views the current web page, the past page, and the future web page in the single window. Preferably, a web browsing room is implemented in a three-dimensional space where walls of the rooms correspond to various ones of the aforementioned panels. The user can view the web pages in the browsing room using various three-dimensional navigation techniques.

61 Claims, 7 Drawing Sheets

U.S. PATENT DOCUMENTS

| | | | |
|---|---|---|---|
| 6,101,328 A * | 8/2000 | Bakshi et al. | 717/170 |
| 6,119,155 A | 9/2000 | Rossmann et al. | |
| 6,122,647 A | 9/2000 | Horowitz et al. | |
| 6,131,110 A | 10/2000 | Bates et al. | |
| 6,133,916 A | 10/2000 | Bukszar et al. | |
| 6,144,991 A | 11/2000 | England | |
| 6,145,000 A | 11/2000 | Stuckman et al. | |
| 6,154,771 A | 11/2000 | Rangan et al. | |
| 6,177,936 B1 | 1/2001 | Cragun | |
| 6,356,908 B1 | 3/2002 | Brown et al. | 707/10 |
| 6,590,586 B1 * | 7/2003 | Swenton-Wall et al. | 345/738 X |

OTHER PUBLICATIONS

"Conference on Human Factors and Computing Systems Vancouver, Canada Apr. 13-18, 1996," ACM Digital Library, http://www.acm.org/pubs/citations/proceedings/chi/238386/p111-card/, 2 pages.

Stuart K. Card, et al., "The WebBook and the Web Forager" An Information Workspace for the World-Wide-Web, http://www.acm.org/sigchi/chi96/proceedings/papers/Card/skc1txt.html, 13 pages.

Kopetzky et al., "Visual Preview for Link Traversal on the World Wide Web", *Computer Networks*, vol. 31, No. 11-16, May 17, 1999, pp. 1525-1532.

Kandogan et al., "Elastic Windows: A Hierarchical Multi-Window World-Wide Web Browser", UIST '97, 10th Annual Symposium on User Interface Software and Technology, Proceedings of the ACM Symposium on User Interface Software and Technology, Oct. 14-17, 1997, pp. 169-177, XP002268876.

Ayers et al., "Using Graphic History in Browsing the World Wide Web", *Proceedings of the International Conference on World Wide Web*, Dec. 1995, pp. 451-459, XP002082850.

* cited by examiner

SYSTEM AND METHOD FOR WEB BROWSING

CROSS REFERENCE TO RELATED APPLICATIONS

The present application is a continuation of application Ser. No. 09/498,079, entitled "System and Method for Web Browsing," which was filed on Feb. 4, 2000, and issued as U.S. Pat. No. 6,313,855 to Shuping et al. on Nov. 6, 2001.

BACKGROUND

1. Field of the Invention

The present invention relates generally to web browsers and more particularly to a web browser that displays a current web page along with past web pages and/or future web pages m a unique browsing environment.

2. Discussion of the Related Art

The Internet has dramatically changed the manner in which we access, gather, and collect information. Often referred to as the "World Wide Web," the Internet provides a user with a host of "web pages." A web page is rendered from web page data that may be retrieved from a source of web page data, often via the Internet using various well-known protocols. The web page data is often in the form of a hypertext mark-up language (e.g., HTML, DHTML, XML, etc.) or a scripting language (e.g., Java, JavaScript, etc.), and often includes a reference or hyperlink (i.e., a URL address) to another web page. The web page data may include other forms of source language and other forms of data as would be apparent. Once the web page data is rendered, the web page may be displayed to the user for viewing. The actions of selecting a web page, retrieving web page data associated with the web page, rendering that data, and displaying the web page to the user is often referred to as "web browsing."

Various conventional web browsing engines, or web browsers as they are commonly referred, are available. These web browsers may, for example, include Microsoft's Internet Explorer™ and Netscape's Navigator™. These web browsers facilitate web browsing and provide the user with a host of browsing features including bookmarks and history functions.

However, one of the problems associated with conventional web browsers is that typically, only one web page is rendered at any given time for display to the user. Conventional methods for overcoming this problem include the user opening a second instance of the web browser and manually switching back and forth between the instances, or alternately, the user manually moving and/or resizing a window in which each instance operates so that the respective instances can be contemporaneously viewed.

Another problem associated with conventional web browsers is navigating to previously visited web pages. Conventional web browsers typically maintain a list of previously visited or "past" web pages. This list of past web pages provides a history of the web pages visited by the user during a particular session. At various times, the user may return to a past web page, for example, by using a pull down menu to select a particular past web page from the history list. However, the list is cumbersome to use as the past web page is not always readily identifiable among the references maintained in the history list. As a result, the user must often navigate backwards through the history list in order to return to the desired past web page. The user may also return to a past web page by selecting a "backward" navigation button available on a tool bar of conventional web browsers. The backward button navigates the user sequentially through the history list as is well known.

Another problem associated with conventional web browsers is that future web pages are not viewable from a currently displayed web page. A future web page is a web page that is referenced via a hyperlink on a current web page. Future web pages are not viewable with conventional web browsers until the user selects that hyperlink. In order to determine whether a particular web site includes anything of interest, the user must manually select each hyperlink to have the web browser retrieve and render the hyperlinked web pages.

What is needed is an improved system and method for web browsing.

SUMMARY OF THE INVENTION

The present invention provides a system and method for web browsing. Generally speaking, the present invention contemporaneously displays multiple web pages, preferably within a single window, for the user to view. In one embodiment of the present invention, a current web page and a past web page are contemporaneously displayed in a single window. In this embodiment, the present invention tracks a past web page and renders it in a first panel, and renders the current web page in a second panel, all preferably embedded within a single window. In this manner, the user contemporaneously views both the current web page and the past page in a single window.

In another embodiment of the present invention, a current web page and a future web page are contemporaneously displayed. In this embodiment, the present invention locates a hyperlink to a future web page in web page data associated with the current web page and automatically retrieves the corresponding web page data associated with the future web page. The present invention renders the current web page in a first panel, and renders the future web page in a second panel, preferably embedded within a single window. In this manner, the user contemporaneously views both the current web page and the future web page in a single window.

In another embodiment of the present invention, a past web page, a current web page, and a future web page are contemporaneously displayed within a single window. This embodiment of the present invention incorporates both the past web page as well as the future web page aspects of the previously described embodiments. According to this embodiment, the present invention renders the current web page in a first panel, renders the past web page in a second panel, and renders a future web page in a third panel.

In yet another embodiment of the present invention, the panels for rendering the various web pages are provided in a three-dimensional space. Preferably, these panels are provided as walls in a browsing room in which a user is able to navigate. In this embodiment, the user is able to navigate in the room using well-known techniques whereby the user may change his perspective (i.e., view different walls from various angles), zoom in, zoom out, etc., in the three-dimensional space. Preferably, in an embodiment employing a room with three walls, the left wall includes the past web page, the center wall includes the current web page, and the right wall includes the future web page. In other embodiments of the present invention, any number of panels for displaying various web pages within the three-dimensional space may exist.

In yet still another embodiment of the present invention, a plurality of past web pages are rendered in a panel. In one embodiment of the present invention, each of the plurality of past web pages is rendered as a thumbnail image. In another embodiment of the present invention, each of the plurality of past web pages is rendered as a fully functional web page in an active web browser. Preferably, the number and/or organization of these web pages may be configured according to user preference.

In still another embodiment of the present invention, a plurality of future web pages are rendered in a panel. Preferably, each of the future web pages referenced via a hyperlink on the current web page is rendered in the panel. In one embodiment of the present invention, each of the plurality of future web pages is rendered as a thumbnail image. In another embodiment of the present invention, each of the plurality of future web pages is rendered as a fully functional web page in an active web browser. Preferably, the number and/or organization of these web pages may be configured according to user preference.

One of the features of the present invention is that the past web page may be viewed contemporaneously with the current web page. This feature also preferably allows the user to return to the past web page by selecting it, for example, by clicking on it, in its respective panel.

Another feature of the present invention is that the future web page may be viewed contemporaneously with the current web page. This feature allows the user to navigate a web site more rapidly by viewing a future web page from its appearance rather than by some obtuse description. This feature also preferably allows the user to go to the future web page by selecting it in its respective panel.

Yet another feature of the present invention is that the browsing room in the three-dimensional space may include a floor, for example, that may display various system information such as number of bytes downloaded, number of bytes to download, download rate, download time, download time remaining, etc.

Yet still another feature of the present invention is that a user may designate a past web page as a "sticky" web page. Such a designation indicates that the sticky web page remains in its respective panel (and at its designated position, if appropriate) regardless of additional past web pages generated by subsequent browsing. In other words, the past web page so designated "sticks" on the panel until the user releases the designation.

Still another feature of the present invention is that a user may designate a future web page as a sticky web page. Such a designation indicates that the sticky web page remains in its respective panel (and at its designated position, if appropriate) regardless of new future web pages generated by the selection of a new current web page as a result of subsequent browsing. In other words, the future web page so designated "sticks" on the panel until the user releases the designation.

These and other features and advantages of the present invention will become apparent from the following drawings and description.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

The present invention is directed to a system and method for web browsing that displays multiple web pages thereby allowing a user to contemporaneously view more than a single web page in a single window. More particularly, the present invention is directed to a system and method for web browsing that contemporaneously displays a past web page, a current web page, and a future web page for viewing by the user, preferably within a three-dimensional space.

Figure 1:
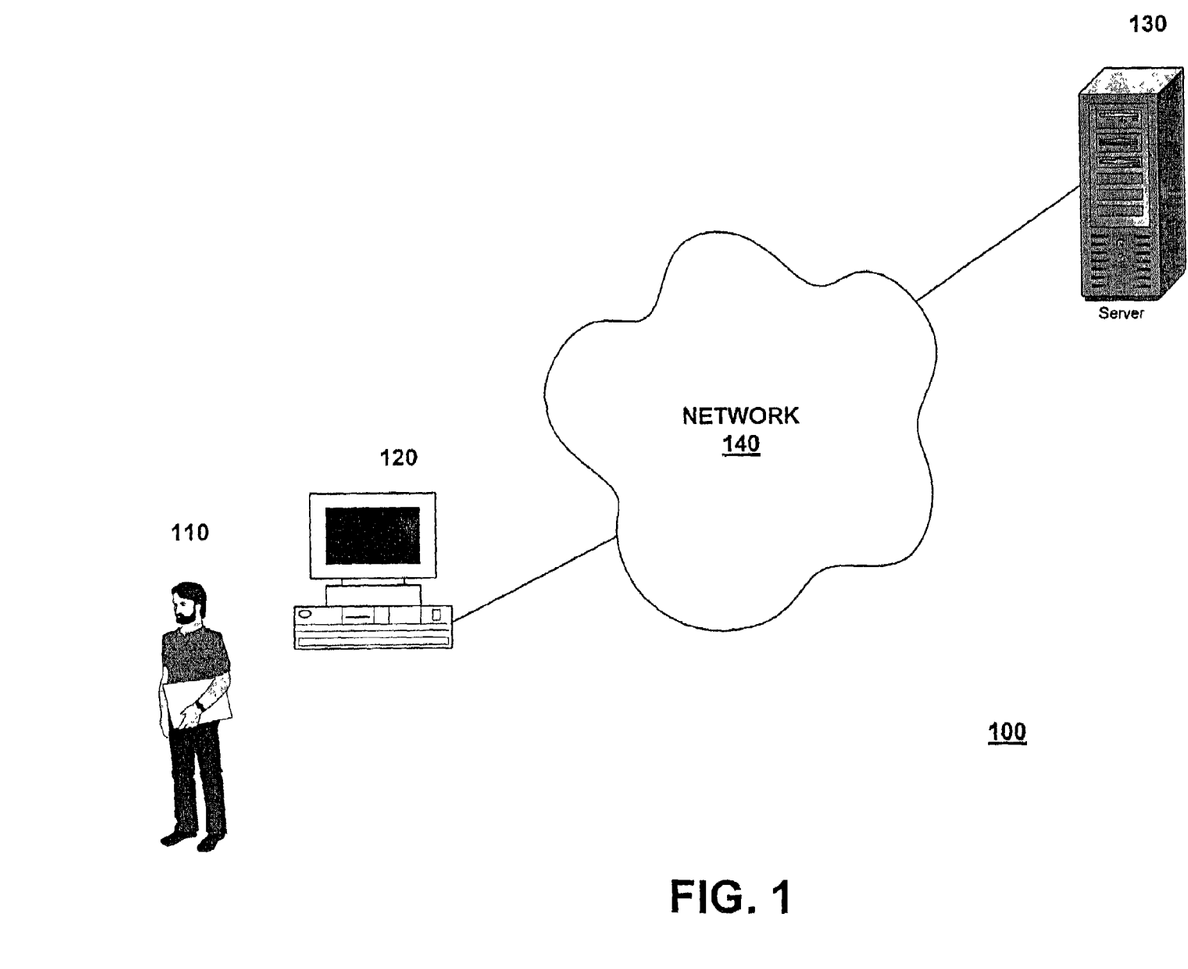
FIG. 1 illustrates a computer network that facilitates web browsing.

FIG. 1 illustrates a computer network 100 including a user 110 participating in a web browsing session via a computer 120 connected to at least one server 130 via a network 140. Computer 110 may be any electronic communicating device capable of interfacing with network 140. Such devices may include computers, laptops, telephones, cellular phones, personal data accessories ("PDA"), pagers, web enabled televisions ("WebTV"), or other similar electronic communication devices, as would be apparent. Network 140 may be any form of interconnecting network including an intranet, such as a local or wide area network, or an extranet, such as the World Wide Web, or the Internet. Such networks 140 may include various wireless connections as would be apparent. Server 130 may be any sort of storage device for providing web page data to users as would be apparent.

During a browsing session, user 110 accesses a particular web page using a web browser (also referred to as web browsing engine) such as Microsoft's Internet Explorer™ or Netscape's Navigator™ operating on computer 120. In order to access a web page, the web browser sends a request to a particular web site using a Uniform Resource Locator ("URL") address associated with the desired web page. The request is passed through network 140 using an appropriate network protocol. For example, when network 140 comprises the Internet, a Hyper Text Transfer Protocol ("HTTP") is used that encapsulates the request to facilitate its transmission through network 140. Other network protocols may also be used as would be apparent.

Using the URL address, the request is routed to a server (or servers) 130 hosting the web page. Once located, the appropriate server 130 analyzes the request and sends web page data corresponding to the request back to computer 120 using the appropriate network protocol (e.g., HTTP). The browser receives the web page data at computer 120. This process of requesting and retrieving web page data is well known.

The web page data includes various markup language data (e.g., HTML, DHTML, XML, etc.), scripting language data (e.g., Java, JavaScript, etc.), and various other data and or files (e.g., image files) that comprise the content of the web page as is well known. The web page data may also include a reference, sometimes referred to as a "hyperlink." Typically, the hyperlink is an embedded URL address to another web page. The web browser renders the web page data into a web page and facilitates the display of the web page in a "window" on computer 120 in a well-known manner.

Figure 2:
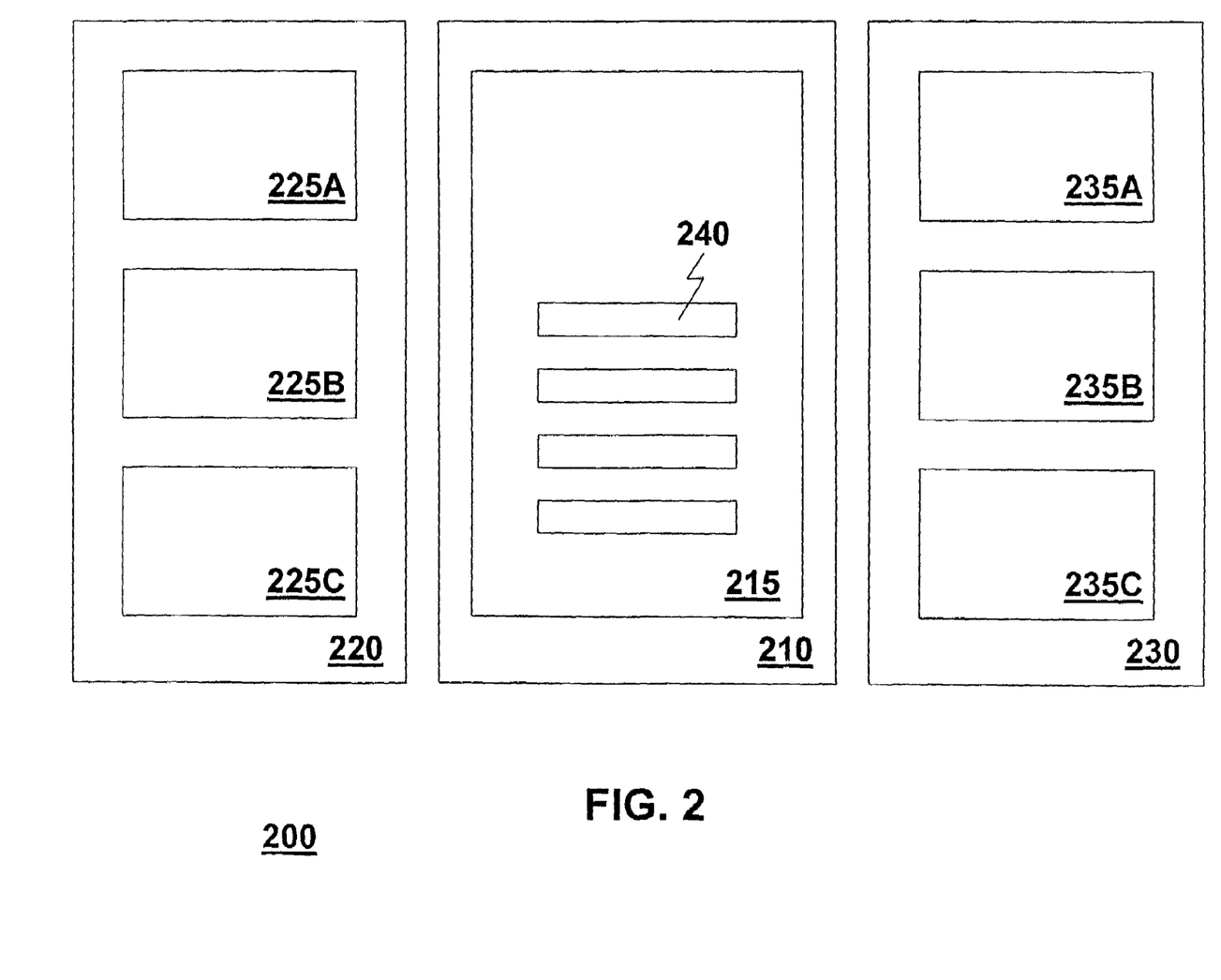
FIG. 2 illustrates a web browser according to one embodiment of the present invention.

FIG. 2 illustrates a web browser 200 operating in a single window according to the present invention. Web browser 200 includes a current panel 210 and at least one of a past panel 220 and a future panel 230. Preferably, web browser 200 includes both past panel 220 and future panel 230.

Current panel 210 includes a current web page 215. Current panel 210 preferably operates in a manner similar to a conventional web browser. In a preferred embodiment of the present invention, an active conventional web browser is mapped onto current panel 210. From current panel 210, user 110 may access various web pages in a conventional manner using the conventional web browser. In a preferred embodiment of the present invention, the conventional web browser "plugs in" to web browser 200 thereby providing web browser 200 with a web browsing engine to perform these conventional aspects of the present invention. This concept of plugging a conventional web browser into web browser 200 is referred to as a "reverse plug-in." Plug-ins are generally well known.

Past panel 220 operates in connection with current page 210 to display at least one past web page 225 (illustrated in FIG. 2 as past web pages 225A-C). In a preferred embodiment of the present invention, past panel 220 includes one or more web browsing engines embedded therein (i.e., its own instances of the web browsing engine) for managing past web page 225. In another embodiment, the present invention generates a thumbnail image using the web page data associated with past web page 225 and renders the thumbnail image in panel 220 using various well-known techniques.

In this manner, user 110 may view one or more past web pages 225 in past panel 220 contemporaneously with current web page 215 in current panel 210. Preferably, user 110 may configure past panel 220 to display, for example, "X" number of past web pages 225 organized in a "m by n" matrix. In one embodiment of the present invention, during a browsing session, the present invention shifts the least recent past web page 225 off past panel 220 to accommodate more recent past web pages 225.

In operation, when user 110 selects a new web page, current web page 215 is transferred to past panel 220. To accommodate this transfer, the present invention shifts past web pages 225 by one web page location thereby eliminating one web page from past panel 220. For example, past web page 225C may represent the least recent past web page, and past web page 225A may represent the most recent past web page. In this example, when user 110 selects a new web page, past web page 225C is shifted off past panel 220, past web page 225B is shifted to the location formerly occupied by past web page 225C, and past web page 225A is shifted to the location formerly occupied by past web page 225B. Current web page 215 is then transferred to past panel 220 and positioned at the location formerly occupied by past web page 225A. The present invention then renders the new selected web page as current web page 215 in current panel 210.

In addition to displaying past web pages 225, web browser 200 provides a mechanism whereby any of past web pages 225 may be recalled as current web page 215. This mechanism is in addition to other mechanisms for selecting web pages in with a conventional web browser. In particular, user 110 may "click on" a past web page 225 in past panel 220 to restore that web page as current web page 215 in current panel 210. In one embodiment, the present invention maintains an associated URL address for each of past web pages 225 so that they may be recalled in this manner.

Future panel 230 operates in connection with current page 210 to display at least one future web page 235 (illustrated in FIG. 2 as future web pages 235A-C). Future web page 235 is a web page referenced in a hyperlink 240 included in current web page 215. In other words, future web page 235 may be thought of as a preview of the web page that would otherwise be conventionally retrieved if user 110 selected hyperlink 240. In a preferred embodiment of the present invention, future panel 230 includes one or more web browsing engines embedded therein (i.e., instances of the web browsing engine) for managing future web pages 235. In another embodiment, the present invention generates a thumbnail image using the web page data associated with future web page 235 and renders the thumbnail image in future panel 230 using well-known techniques.

In this manner, user 110 may view one or more future web pages 235 in future panel 230 contemporaneously with current web page 215 in current panel 210. Preferably, user 110 may configure future panel 230 to display, for example, "X" number of future web pages 235 organized in a "m by n" matrix.

In operation, when user 110 selects a new web page, web browser searches the web page data associated with the new web page for any hyperlinks 240 included therein. If a hyperlink 240 is located, web browser automatically retrieves the web page data referenced by hyperlink 240 and renders it as future web page 235 in future panel 230. In this manner, user 110 may view future web pages 235 without having to manually "drill down" to them via hyperlinks 240.

In addition to displaying future web pages 235, web browser 200 provides a mechanism whereby any of future web pages 235 may be selected as current web page 215. In particular, user 110 may "click on" a future web page 235 to select the web page as current web page 215 in current panel 210. In one embodiment of the present invention, web browser 200 maintains an associated URL address for each of future web pages 235 so that user 110 can access them from future panel 230.

In one embodiment of the present invention, web browser 200 controls separate display devices, one for each of past panel 220, current panel 210 and future panel 230, organized as a so-called "tri-monitor" for web browsing. A single computer 120 may control the output to each of the display devices providing a full screen view for each of panels 210, 220, 230. Techniques for providing separate outputs to multiple display devices are well known.

Figure 3:
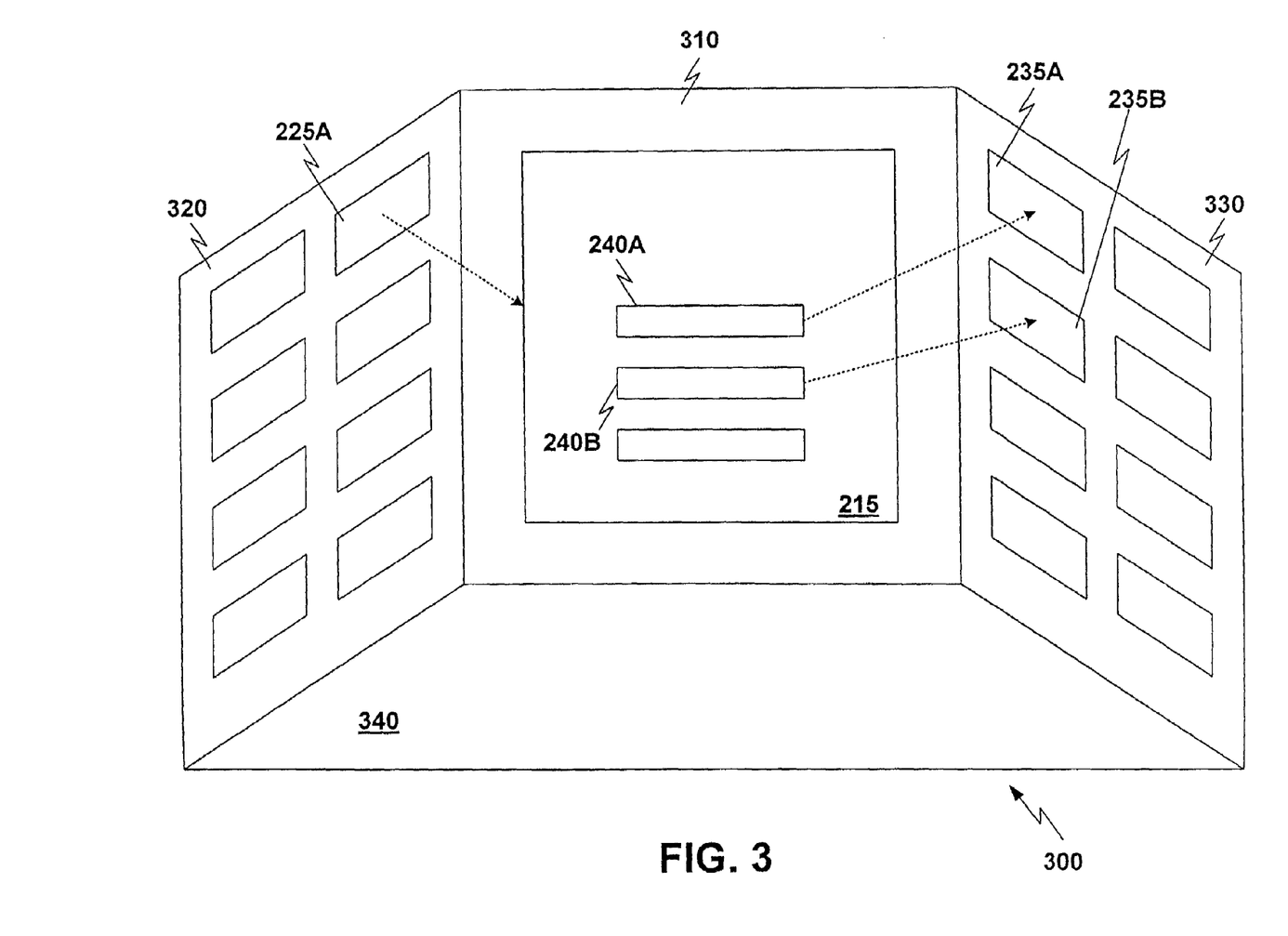
FIG. 3 illustrates a web browser according to a preferred embodiment of the present invention.

FIG. 3 illustrates a preferred embodiment of the present invention. In particular, FIG. 3 illustrates a browsing room 300 operating in a three-dimensional environment or space. Browsing room 300 includes a current wall 310 and at least one of a past wall 320 and a future wall 330. Preferably, browsing room 300 includes both past wall 320 and future wall 330. These walls 310, 320, and 330 operate in a manner similar to their counterpart panels 210, 220 and 230 as described above. In one embodiment of the present invention, browsing room 300 may also include a floor 340.

In one embodiment of the present invention, browsing room 300 and the three-dimensional environment are implemented using various well known three dimensional rendering tools such as OpenGL™ available from Silicon Graphics Incorporated or DirectX™ available from Microsoft. These tools allow various abstractions including active objects (e.g., web browsers) and passive objects (e.g., images) to be embedded on objects in the three-dimensional environment.

Preferably, user 110 is able to navigate in browsing room 300 according to well-known three-dimensional navigation techniques. In browsing room 300, user 110 may, for example, change his perspective to view only one of walls 310, 320, 330. User 110 may also zoom in to a particular wall to get a closer view of, for example, past web page 225A or future web page 235A. User 110 may also zoom out to simultaneously view all walls 310, 32, 330 and floor 340. Other features associated with navigating a three-dimensional space such as browsing room 300 are also contemplated as would be apparent.

In a preferred embodiment, each of walls 310, 320, and 330 include one or more instances of active conventional web browsers. For example, each of past web pages 225 would include the active web browser, as well as each of future web pages 235, in addition to the active web browser operating in current wall 320. In this embodiment, each web page 215, 225 and 235 is active and dynamic, capable of receiving updates, etc., in a conventional manner. Other embodiments of the present invention, specifically those constrained by, for example, processing power or network bandwidth, may be restricted to a single active conventional web browser operating in current web page 215. In these embodiments, web pages 225 and 235 are preferably thumbnail images rendered in walls 320 and 330, respectively.

As illustrated in FIG. 3, browsing room 300 provides user 110 with a visualization of where he has been and/or where he is going during a particular browsing session. For example, past wall 320 includes one or more past web pages 225 including a past web page 225A. In a preferred embodiment, past web page 225A, as illustrated in FIG. 3, occupies a location of the most recently visited past web page. In other words, user 110 visited past web page 225A just prior to selecting current web page 215. Other arrangements of past web pages 225 in past wall 320 may be made as would be apparent.

In one embodiment of the present invention, past web page 225A includes a reference or hyperlink to current web page 215. In this embodiment, user 110 arrives at current web page 215 by selecting the hyperlink on past web page 225A when it was the current web page. This relationship is illustrated in FIG. 3 by a dotted arrow connecting past web page 225A with current web page 215. Other mechanisms exist for arriving at current web page 215 without using the hyperlink on past web page 225A as would be apparent.

Future wall 330 includes one or more future web pages 235 including, for example, a future web page 235A and a future web page 235B. In one embodiment, future web page 235A, as illustrated in FIG. 3, occupies a location of the first reference or hyperlink found in web page data associated with current web page 215. Future web page 235B occupies a location of the second reference or hyperlink found in the web page data associated with current web page 215. In an alternate embodiment of the present invention, future web pages 235 occupy locations in future wall 330 based on various indicia associated with each future web page 235. For example, future web pages 235 may be organized by their respective popularity as determined by a number of hits each receives. Alternately, future web pages 235 may be organized based on their respective dates of being updated. Other arrangements of future web pages 235 in future panel 330 using these and other criteria may be made as would be apparent.

As discussed above, current web page 215 includes a reference or hyperlink 240 to a future web page 235. Current web page 215 includes hyperlinks 240A and 240B that correspond to future web pages 235A and 235B, respectively, as indicated by dotted arrows in FIG. 3. User 110 may arrive at current web page 215 in any manner. Once web page data associated with current web page 215 is received, the present invention locates any of hyperlinks 240 included therein. The present invention retrieves and renders future web page 235 corresponding to each of the located hyperlinks 240 included in the web page data and displays them in future wall 330.

In a preferred embodiment of the present invention, any of past web pages 225 or future web pages 235 may become current web page 215 by clicking on past web page 225 in past wall 320 or future web page 235 in future wall 330, respectively. The present invention stores or otherwise maintains a reference (i.e., a URL address) for each past web page 225 in past wall 320 and for each future web page 235 in future wall 330. Thus, when user 110 selects a particular past web page 225 (for example, past web page 225A), the particular past web page 225 on past wall 320 becomes current web page 215 on current wall 310. Likewise, when user 110 selects a particular future web page 235 (for example, future web page 235A), the particular future web page 235 on future wall 330 becomes current web page 215 on current wall 310.

In one embodiment of the present invention, any of past web pages 225 and future web pages 235 may become sticky web pages on their respective walls 320 and 330. When a user 110 designates a particular web page 225, 235 as a sticky web page, that web page 225, 235 remains at the designated location on the respective wall 320, 330 regardless of changes in current web page 215. For example, if user 110 designates past web page 225A as a sticky web page, past web page 225A remains in the illustrated location regardless of additional past web pages 225 generated as a result of subsequent browsing. Likewise, if user 110 designates future web page 235A as a sticky web page, future web page 235A remains in the illustrated location regardless of new future web pages 235 generated from hyperlinks 240 on any new current web pages 215 selected during subsequent browsing.

In one embodiment, sticky web pages may be transferred to a separate panel in browsing room 300 (e.g., another wall, a ceiling, a floor, etc.). In this embodiment, the user may also "drag and drop" the web page 225, 235 to a so-called "sticky surface" to designate the web page as a sticky web page. Once on the sticky surface, web page 225, 235 remains there until removed by user 110.

User 110 may designate web page 225, 235 as a sticky web page, for example, by right clicking on web page 225, 235 and selecting an appropriate choice from a menu to designate the web page as a sticky window. Other mechanisms for designating web page 225, 235 as a sticky web page are available as would be apparent. The sticky web page remains in its designated location until user 110 releases the sticky web page.

In one embodiment of the present invention, user 110 may bookmark current web page 215. According to one embodiment of the present invention, when user 110 bookmarks current web page 215, an entire scene of browsing room 300 is stored for later recall. In other words, the bookmark includes not only a reference to current web page 215, but also to each of past web pages 225 and future web pages 235 as well as their respective locations so that the entire scene of browsing room 300 may be recreated. In another embodiment of the present invention, the bookmark need only include the reference to current web page 215 and the references to past web page 225 as the references to future web pages 235 may be found in the web page data associated with current web page 215. In yet another embodiment of the present invention, the bookmark includes the reference to current web page 215 as well as references and designated locations for each of the sticky web pages in browsing room 300. In still another embodiment of the present invention, the bookmark only includes a reference to current web page 215. In yet still another embodiment of the present invention, user 110 may select from any of the above-described methods of bookmarking as would be apparent. Various other mechanisms and combinations for bookmarking browsing room 300 are available as would be apparent.

In some embodiments of the present invention, past wall 320 and future wall 330 may not be large enough to include all of past web pages 225 or future web pages 235, respectively. For example, when current web page 215 includes a large number of hyperlinks 240, or during a long browsing session, walls 320, 330 may not include a sufficient number of locations to accommodate all of the corresponding web pages 225, 235. With respect to past wall 320, in one embodiment of the present invention, the least recent past web pages simply are shifted off of past wall 320. With respect to future wall 330, in one embodiment of the present invention, future web pages 235 may be included in future web page 330 in a "first come, first served" manner or alternately, based on the popularity of each of future web page 330. In another embodiment of the present invention, a scroll feature may be incorporated into each of past wall 320 and future wall 330. For example, a "page down" and a "page up" button may be included in each wall 320, 330 to display a virtually infinite number of additional web pages 225, 235. In yet another embodiment of the present invention multiple past walls 320 and/or future walls 330 may be used to accommodate additional web pages 225, 235 respectively.

In one embodiment of the present invention, browsing room 300 includes floor 340. Floor 340 may include various status information associated with web browsing. Such status information may include, but is not limited to, a number of bytes to download, a number of bytes already downloaded, a rate at which bytes are being downloaded, a total time to complete the download, a time remaining to complete the download, and/or a plethora of other statistics associated with downloading web page data as would be apparent.

In another embodiment of the present invention, floor 340 includes an application program such as a clipboard. Preferably, the clipboard accepts various input from "cut and paste" operations from any of web pages 215, 225, 235. This input may be in the form of data, text, diagrams, images, etc., as would be apparent. The clipboard may be used to build various documents, presentations, etc., using various data available on the Internet. Other applications such as spreadsheets, word processes, etc., may be incorporated into floor 340 (or other surface) in a similar manner.

Figure 9:
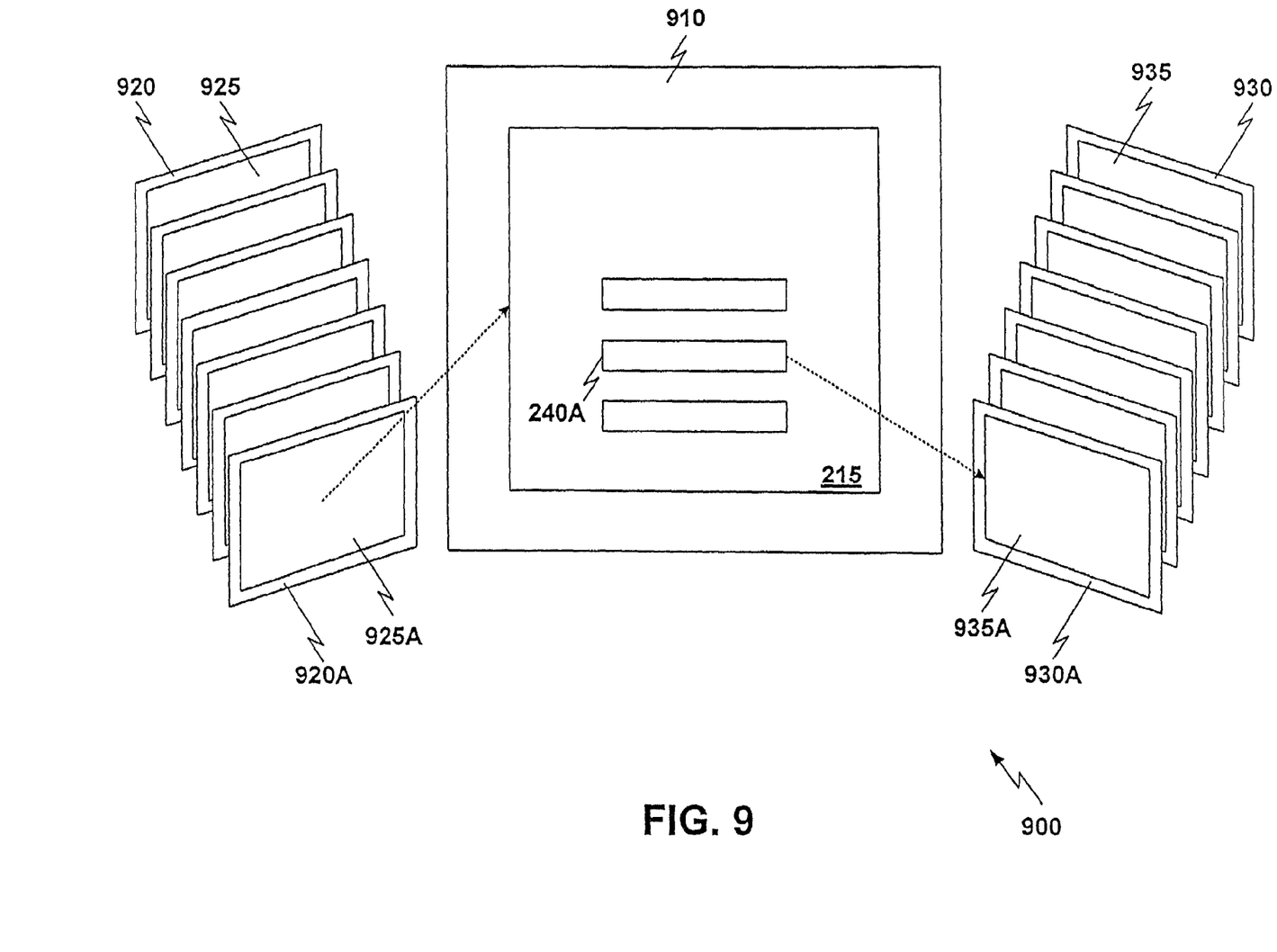
FIG. 9 illustrates a web browser according to one embodiment of the present invention.

FIG. 9 illustrates a web browser 900 operating in a three dimensional environment that includes a current panel 910, a plurality of past panels 920 and a plurality of future panels 930. Other panels (not illustrated) may be included in web browser 900 such as a floor panel, a ceiling panel, a sticky page panel, etc. User 100 may navigate through the three-dimensional environment of web browser 900 to view any of the web pages included therein.

Current panel 910 operates in a manner similar to that described above with respect to current panel 210. Specifically, current panel 910 includes current web page 215 having one or more hyperlinks (illustrated as hyperlink 240A).

Each of past panels 920 includes at least one past web page 925. For example, past panel 920A includes a past web page 925A. As illustrated, past panels 920 are arranged in a tiled fashion preferably organized from a most recent past panel 920 in the foreground to a least recent past panel 920 in the background. However, any arrangement of past panels 920 in three dimensional space is contemplated. As also illustrated, past web page 925A in past panel 920 includes a reference to current web page 215 in current panel 910.

Each of future panels 930 includes at least one future web page 935. For example, future panel 930A includes a future web page 935A. As illustrated, future panels 930 are arranged in a tiled fashion. Various mechanisms for organizing future panels 930 exist, some of which are described above. Likewise various arrangements of future panels 930 in three-dimensional space is contemplated. As also illustrated, current web page 215 includes hyperlink 240A to future web page 935A in future panel 930A.

Past panels 920 and future panels 930 operate in a manner similar to their counterparts as described above and as described in further detail below. In this embodiment however, rather than shifting the least recent past web page 925 off past panel 930, an new past panel may be created to accommodate additional past web pages 925. Likewise, rather than selecting a subset of hyperlinks 240 to be included in future panel 930, a sufficient number of future panels 930 are generated to accommodate the corresponding future web pages 935. Virtually an infinite number of past panels 920 and/or future panels 930 may be included in web browser 900.

The operation of web browser 200 is now described with reference to FIGS. 2 and 4-8. As will become apparent from reading the following description, the operation of web browser 200 applies equally to the operation of browsing room 300 illustrated in FIG. 3.

Figure 4:
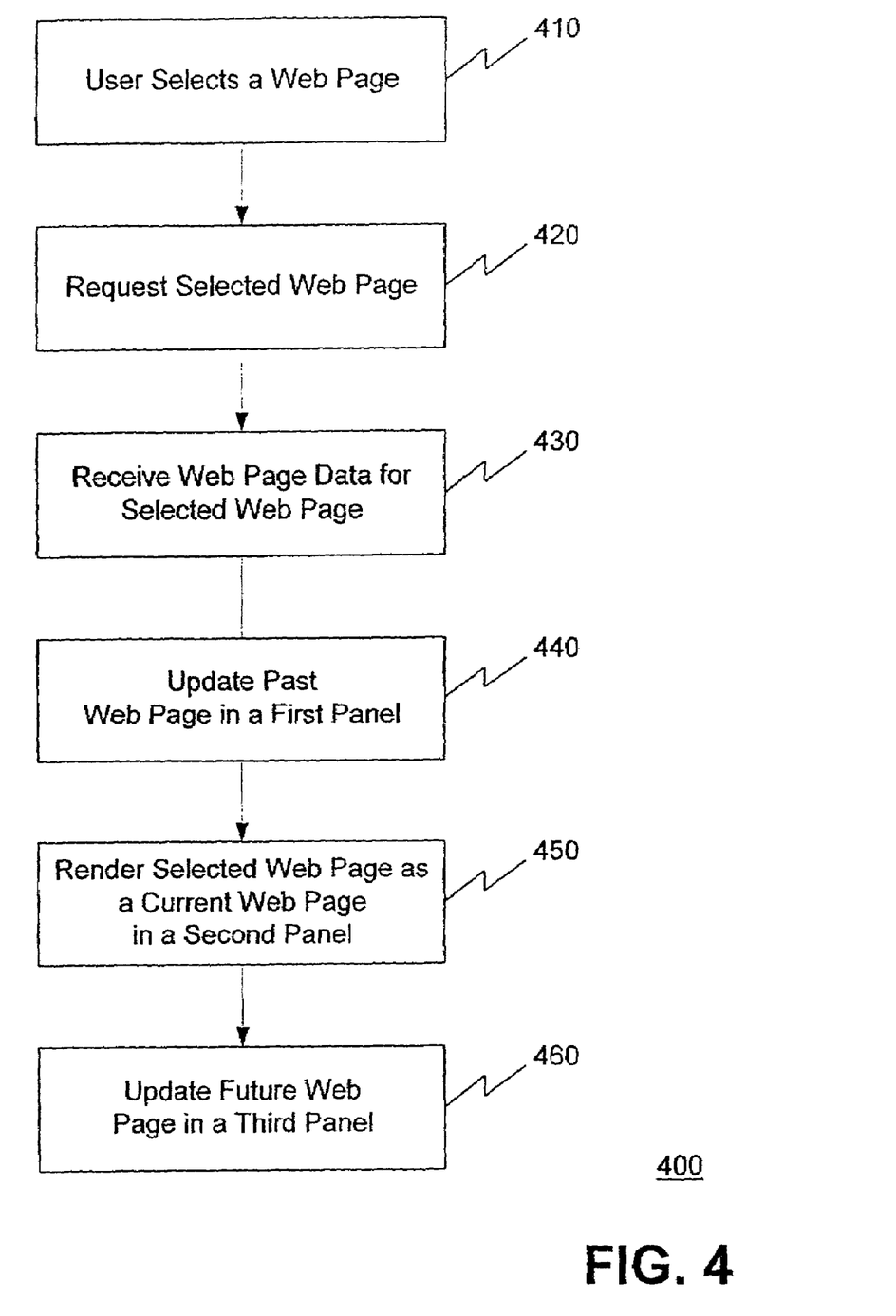
FIG. 4 illustrates an operation of the web browser according to a preferred embodiment of the present invention.
Figure 5:
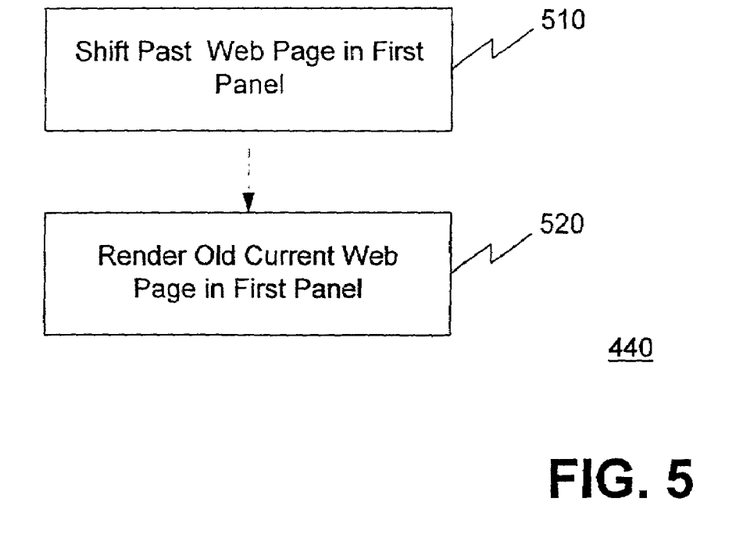
FIG. 5 illustrates an operation of updating past web pages according to one embodiment of the present invention.

FIG. 4 illustrates an operation 400 of web browser 200 according to a preferred embodiment of the present invention. In a step 410, user 110 selects a web page according to one of several techniques available for selecting web pages. In response to the selection by user 110, in a step 420, web browser 200 requests the selected web page from an appropriate source of web pages in accordance with the operation of network 140. In a step 430, web browser 200 receives the web page data associated with the selected web page.

After receiving the selected web page data, in a step 440, web browser 200 updates past web page 225 in a first panel (e.g., past panel 220, past wall 320, etc.). Step 440 is now described according to one embodiment of the present invention in further detail with reference to FIG. 5. In a step 510, each of past web pages 235 is shifted in the first panel to a next less recent location to accommodate the old current web page 215. In this step, the least recent past web page 225 is shifted off the first panel. In a step 520, the old current web page 215 is rendered in the first panel as the most recent past web page 225.

Figure 6:
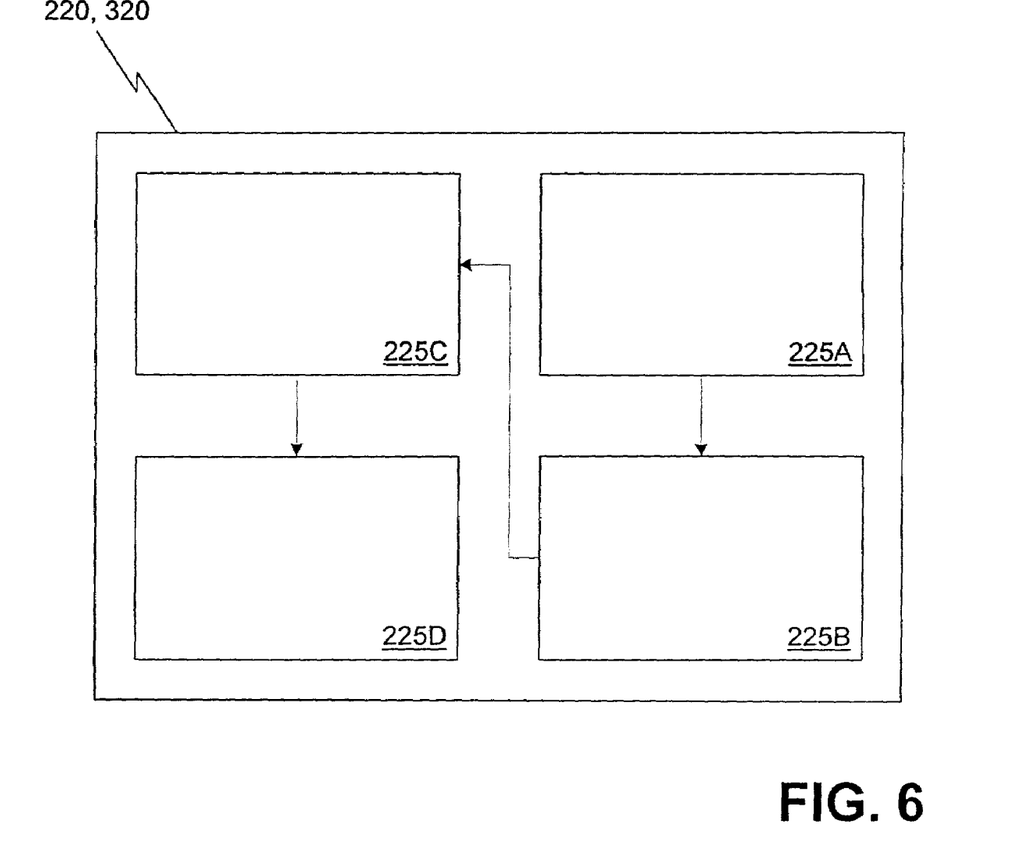
FIG. 6 illustrates an organization of past web pages according to one embodiment of the present invention.

FIG. 6 is an exemplary organization for past web pages 225 in first panel (e.g., past panel 220, past wall 320). As illustrated, past web page 225A is the most recent past web page, past web page 225B is the next most recent past web page, past web page 225C is the next least recent past web page; and past web page 225D is the least recent web page. During step 510, past web page 225D is shifted off the first panel; past web page 225C is shifted to the location of past web page 225D; past web page 225B is shifted to the location of past web page 225C; and past web page 225A is shifted to the location of past web page 225B. During step 520, the old current web page 215 is rendered in the location of past web page 225A, thereby becoming the most recent past web page 225. Other organizations and mechanisms for shifting past web pages 225 on the first panel exist as would be apparent.

With reference again to FIG. 4, in a step 450, web browser 200 renders the selected web page data as a new current web page 215 in a second panel (e.g., current panel 210, current wall 310, etc.) according to well-known techniques for rendering web pages. In a step 460, web browser 200 updates future web page 235 in a third panel (e.g., past panel 230, past wall 330) thereby completing the operation of web browser 200 with respect to current page 215.

Figure 7:
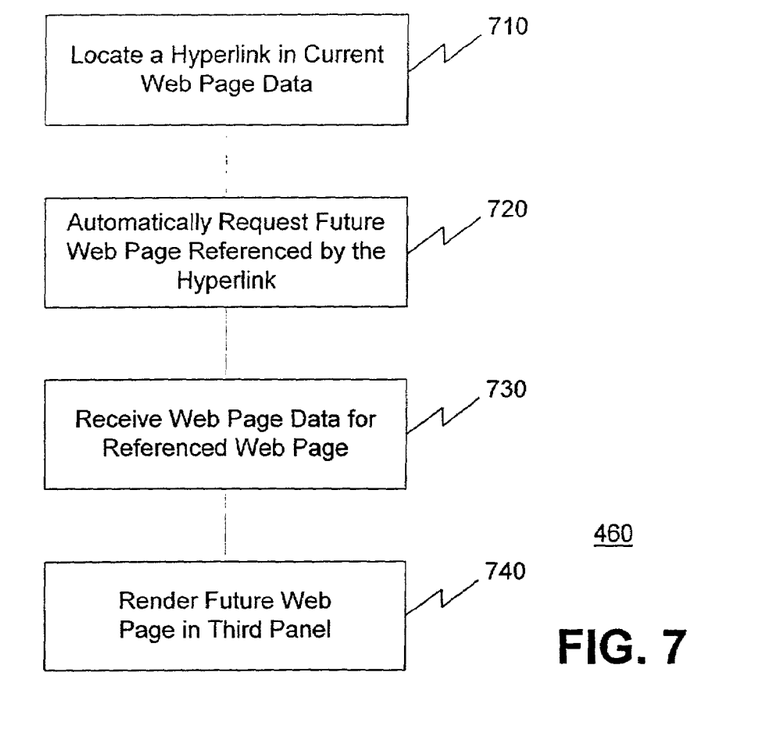
FIG. 7 illustrates an operation of updating future web pages according to one embodiment of the present invention.

Step 460 is now described according to one embodiment of the present invention in further detail with reference to FIG. 7. In a step 710, web browser 200 locates a hyperlink 240 in web page data associated with current web page 215. In a step 720, web browser 200 automatically requests a future web page 235 corresponding to hyperlink 240. Web browser 200 performs this step without action by user 110 with respect to future web page 235. In other words, user 110 does not otherwise select future web page 235 prior to web browser 200 requesting future web page 235. In a step 730, web browser 200 receives web page data associated with future web page 235 from server 130. After this web page data is received, in a step 740, web browser 200 renders future web page 235 in the third panel.

Figure 8:
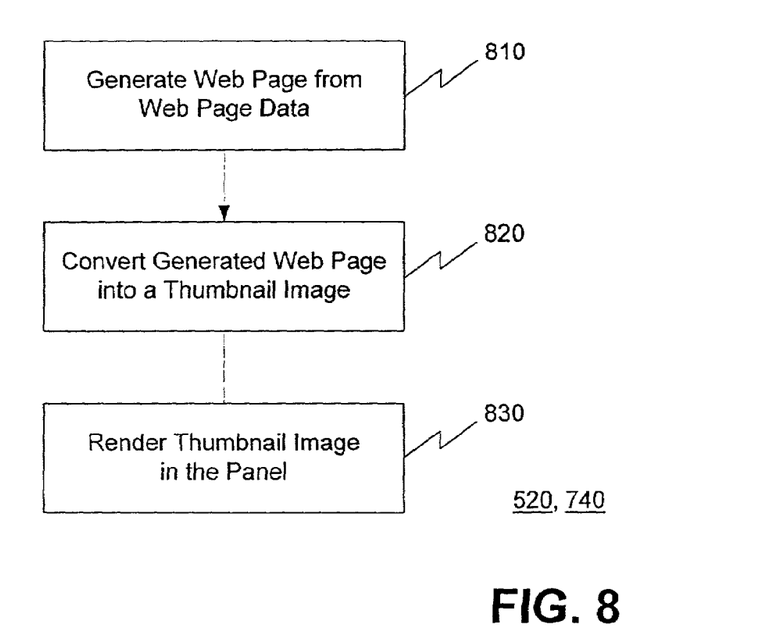
FIG. 8 illustrates an operation of generating a thumbnail image from web page data according to one embodiment of the present invention.

In one embodiment of the present invention, rendering steps 520 and 740 render web pages 225 and 235, respectively, according to well-known techniques for rendering web pages. In an alternate embodiment of the present invention, rendering steps 520 and 740 operate as illustrated in FIG. 8. In a step 810, web browser 200 generates a web page (e.g., past web page 225, future web page 235) from the corresponding received web page data. In a step 820, web browser 200 converts the generated web page into a thumbnail image. In a step 830, the thumbnail image is mapped onto the appropriate panel according to well-known texture mapping techniques.

While the present invention has been described in terms of a preferred embodiment, other embodiments and variations are within the scope of the following claims.

What is claimed is:

1. A method for browsing web pages comprising:
   in response to a user action, requesting first web page data from a source of web page data;
   receiving said first web page data including a reference to second web page data;
   locating said reference to said second web page data in said first web page data;
   automatically requesting said second web page data using said reference;
   rendering a first web page in a first panel from said first web page data using a first instance of a web browsing engine; and
   rendering a second web page in a second panel from said second web page data using a second instance of said web browsing engine.

2. The method of claim 1, wherein said first web page and said second web page are contemporaneously displayed in a single window.

3. The method of claim 1, wherein said rendering a second web page comprises rendering said second web page as a thumbnail image in said second panel using said second web page data.

4. The method of claim 1, further comprising rendering said second web page in said first panel in response to said user selecting said second web page.

5. The method of claim 4, further comprising:
   locating a reference to third web page data in said second web page data;
   automatically requesting said third web page data using said reference to third web page data; and
   rendering a third web page in a third panel using said third web page data.

6. The method of claim 4, further comprising:
   locating a reference to third web page data in said second web page data;
   automatically requesting said third web page data using said reference to third web page data; and
   rendering a third web page in said second panel from said third web page data.

7. The method of claim 6, further comprising rendering said first web page in a third panel from said first web page data.

8. The method of claim 7, further comprising rerendering said first web page in said first panel from said first web page data in response to said user selecting said first web page.

9. The method of claim 8, wherein said rerendering said first web page comprises rerendering said first web page in said first panel from said first web page data in response to said user selecting said first web page from said third panel.

10. The method of claim 1, further comprising:
    requesting third web page data;
    rendering a third web page in said first panel from said third web page data; and
    upon said user action, rendering said third web page in a third panel.

11. The method of claim 10, wherein said third web page data includes a reference to said first web page data.

12. The method of claim 1, wherein said first panel and said second panel are configured in separate planes in a three-dimensional space.

13. The method of claim 5, wherein said first panel, said second panel are configured in separate planes in a three-dimensional space.

14. The method of claim 13, wherein said first panel, said second panel, and said third panel are configured in separate planes in said three-dimensional space.

15. A method for browsing web pages comprising:
    rendering a first web page in a first panel using first web page data using a first instance of a web browsing engine;
    locating a reference to second web page data in said first web page data;
    automatically requesting said second web page data using said located reference; and
    rendering a second web page in a second panel using said second web page data using a second instance of said web browsing engine.

16. The method of claim 15, further comprising:
    rendering a third web page in said first panel using said third web page data; and
    upon a user action, requesting said first web page data; and
    rendering said third web page in a third panel.

17. The method of claim 15, wherein said first panel and said second panel are configured in separate planes in a three-dimensional space.

18. The method of claim 16, wherein said first panel, said second panel, and said third panel are configured in separate planes in a three-dimensional space.

19. A method for browsing web pages comprising:
    requesting first web page data from a source of web page data;
    rendering a first web page in a first panel using said first web page data using a first instance of a web browsing engine;
    requesting second web page data in response to a user action;
    rendering a second web page in said first panel using said second web page data; and rerendering said first web page in a second panel using a second instance of said web browsing engine.

20. The method of claim 19, further comprising:
locating a reference to third web page data in said second web page data;
requesting said third web page data using said located reference; and
rendering a third web page in a third panel.

21. The method of claim 19, wherein said first panel and said second panel are in a single window.

22. The method of claim 20, wherein said first panel, said second panel and said third panel are configured in a three-dimensional space as a center wall, a left wall, and a right wall of a room, respectively.

23. The method of claim 20, wherein said rendering said third web page in said third panel comprises rendering said third web page as a thumbnail image in said third panel.

24. The method of claim 20, wherein said rerendering said first web page in said second panel comprises rendering said first web page as a thumbnail image in said second panel.

25. An apparatus for web browsing comprising:
a computer;
a web browser operating on said computer, said web browser including a first panel that includes a past web page, a second panel that includes a current web page, and a third panel that includes a future web page; and
a trimonitor including a first display device portion that displays said first panel, a second display device portion that displays said second panel, and a third display device portion that displays said third panel.

26. A method for bookmarking web pages in a web browser comprising:
storing a bookmark for a scene rendered by the web browser, said scene including a first web page and a second web page, said bookmark including a reference to said first web page and a reference to said second web page;
selecting said stored bookmark; and
recalling said scene by rendering said first web page and said second web page, wherein said rendering said first web page and said second web page comprises:
rendering said first web page using a first instance of a web browsing engine, and
rendering said second web page using a second instance of said web browsing engine.

27. The method of claim 26, wherein said second web page is a past web page.

28. The method of claim 26, wherein said second web page is a sticky web page.

29. A method for bookmarking web pages in a web browser comprising:
storing a bookmark for a scene rendered by the web browser, said scene including a first web page and a second web page, said bookmark including a reference to said first web page and a reference to said second web page;
selecting said stored bookmark; and
recalling said scene by rendering said first web page and said second web page, wherein said bookmark further includes a display location for said first web page.

30. A method for bookmarking web pages in a web browser comprising:
storing a bookmark for a scene rendered by the web browser, said scene including a first web page and a second web page, said bookmark including a reference to said first web page and a reference to said second web page;
selecting said stored bookmark; and
recalling said scene by rendering said first web page and said second web page,
wherein said second web page is a sticky web page, wherein said bookmark further includes a display location for said first web page.

31. A method for browsing web pages comprising:
requesting first web page data from a source of web page data;
rendering a first web page in a first panel using said first web page data and a first web browsing engine;
requesting second web page data in response to a user action; rendering a second web page in said first panel using said second web page data; and
rendering said first web page in a second panel using said first web page data and a second web browsing engine.

32. The method of claim 31, further comprising:
locating a reference to third web page data in said second web page data;
requesting said third web page data using said located reference; and rendering a third web page in a third panel.

33. The method of claim 31, wherein said first panel and said second panel are in a single window.

34. The method of claim 32, wherein said first panel, said second panel and said third panel are configured in a three-dimensional space as a center wall, a left wall, and a right wall of a room, respectively.

35. The method of claim 32, wherein said rendering said third web page in said third panel comprises rendering said third web page as a thumbnail image in said third panel.

36. The method of claim 32, wherein said rerendering said first web page in said second panel comprises rendering said first web page as a thumbnail image in said second panel.

37. A display system including at least one display device on which is rendered a graphic user interface, the graphical user interface comprising:
a room in a three-dimensional space, said room having a first wall, a second wall, and a third wall,
wherein said first wall includes a past web page rendered thereon, said past web page rendered using a first web browsing engine,
wherein said second wall includes a current web page rendered thereon, said current web page rendered using a second web browsing engine, and
wherein said third wall includes a future web page rendered thereon, said future web page rendered using a third web browsing engine.

38. The display system of claim 37, wherein said current web page includes a hyperlink.

39. The display system of claim 38, wherein said future web page is retrievable via said hyperlink.

40. The display system of claim 37, wherein said room includes a floor having web browsing indicia rendered thereon.

41. The display system of claim 37, wherein said room includes a floor having an application program embedded therein capable of receiving data from a cut-and-paste operation.

42. The display system of claim 37, wherein said room is navigable in said three-dimensional space.

43. The display system of claim 37, wherein when a user selects said previous web page on said first wall, said previous web page is rendered on said second wall thereby becoming a new current web page.

44. The display system of claim 43, wherein after said user selects said previous web page on said first wall, said current web page is rendered on said first wall thereby becoming a new previous web page.

45. The display system of claim 37, wherein when a user selects said future web page on said third wall, said future web page is rendered on said second wall thereby becoming a new current web page.

46. The display system of claim 45, wherein after said user selects said future web page on said third wall, said current web page is rendered on said first wall thereby becoming a new previous web page.

47. The display system of claim 45, wherein after said user selects said future web page on said third wall, a new future web page is rendered on said third wall, said new future web page accessed via a hyperlink in said future web page.

48. An apparatus for web browsing comprising:
a computer;
a web browser operating on said computer, said web browser including a first instance of a web browsing engine that renders a past web page in a first panel, a second instance of a web browsing engine that renders a current web page in a second panel, and a third instance of a web browsing engine that renders a future web page in a third panel; and
a trimonitor including a first display device portion that displays said first panel, a second display device portion that displays said second panel, and a third display device portion that displays said third panel.

49. A method for bookmarking web pages in a web browser comprising:
storing a bookmark for a scene rendered by the web browser, said scene including a first web page and a second web page, said bookmark including a reference to said first web page and a reference to said second web page;
selecting said stored bookmark; and
recalling said scene by rendering said first web page using a first web browsing engine and by rendering said second page using a second web browsing engine.

50. The method of claim 49, wherein said second web browsing engine is an second instance of said first web browsing engine.

51. A method for browsing web pages comprising:
requesting first web page data from a source of web page data;
rendering a first web page in a first panel using said first web page data and a first instance of a web browsing engine;
requesting second web page data in response to a user action;
rendering a second web page in said first panel using said second web page data and a second instance of said web browsing engine; and
contemporaneously displaying said rendered first web page in a second panel.

52. The method of claim 51, wherein said contemporaneously displaying said rendered first web page in said second panel comprises rendering said first web page as a thumbnail image in said second panel.

53. A display system including at least one display device on which is rendered a graphic user interface, the graphical user interface comprising:
a browsing space having a first panel and a plurality of second panels,
wherein said first panel includes a first web page rendered thereon using a first instance of a web browsing engine, said first web page including a plurality of hyperlinks; and
wherein each of said plurality of second panels includes a respective second web page rendered thereon using at least a second instance of said web browsing engine, at least one of said respective second web pages retrievable via a corresponding one of said plurality of hyperlinks.

54. The display system of claim 53, wherein said first panel and at least one of said plurality of second panels are contemporaneously displayed in said browsing space.

55. The display system of claim 54, wherein said browsing space further comprises a plurality of third panels, and wherein each of said plurality of third panels includes a respective third web page rendered thereon.

56. The display system of claim 54, wherein as least one of said plurality of second panels includes a sticky web page that remains in said at least one of said plurality of second panels in response to a change in a web page rendered in said first panel.

57. The display system of claim 54, wherein as least one of said plurality of second panels includes a sticky web page that remains in said at least one of said plurality of second panels in response to a change in a web page rendered in other ones of said plurality of second panels.

58. The display system of claim 55, wherein as least one of said plurality of third panels includes a sticky web page that remains in said at least one of said plurality of third panels in response to a change in a web page rendered in said first panel.

59. The display system of claim 55, wherein as least one of said plurality of third panels includes a sticky web page that remains in said at least one of said plurality of third panels in response to a change in a web page rendered in other ones of said plurality of third panels.

60. The method of claim 49, wherein said first web page and said second web page are contemporaneously displayed in said scene.

61. A computer-readable storage medium storing software instructions that cause a computer to perform computer operations, the computer operations comprising:
rendering a first web page in a first panel from first web page data using a first instance of a web browsing engine;
locating a reference to second web page data in said first web page data;
automatically requesting said second web page data using said located reference; and
rendering a second web page in a second panel from second web page data using a second instance of said web browsing engine.

* * * * *